(12) United States Patent
Sha et al.

(10) Patent No.: US 10,917,871 B2
(45) Date of Patent: Feb. 9, 2021

(54) METHOD AND DEVICE FOR DETERMINING CARRIER FOR BEARING PAGING MESSAGE AND SENDING PAGING MESSAGE

(71) Applicant: ZTE CORPORATION, Guangdong (CN)

(72) Inventors: Xiubin Sha, Guangdong (CN); Qian Dai, Guangdong (CN); Bo Dai, Guangdong (CN); Jianxun Ai, Guangdong (CN); Yuanfang Yu, Guangdong (CN); Yin Gao, Guangdong (CN); Ting Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 3 days.

(21) Appl. No.: 16/314,279

(22) PCT Filed: Jun. 13, 2017

(86) PCT No.: PCT/CN2017/088102
§ 371 (c)(1),
(2) Date: Dec. 28, 2018

(87) PCT Pub. No.: WO2018/001086
PCT Pub. Date: Jan. 4, 2018

(65) Prior Publication Data
US 2020/0187155 A1    Jun. 11, 2020

(30) Foreign Application Priority Data
Jun. 29, 2016    (CN) .......................... 2016 1 0495724

(51) Int. Cl.
*H04W 68/02*    (2009.01)
*H04W 68/00*    (2009.01)

(52) U.S. Cl.
CPC ......... *H04W 68/02* (2013.01); *H04W 68/005* (2013.01)

(58) Field of Classification Search
CPC ........................... H04W 68/02; H04W 68/005
See application file for complete search history.

(56) References Cited

U.S. PATENT DOCUMENTS

| | | | |
|---|---|---|---|
| 2011/0292856 A1 | 12/2011 | Park et al. | |
| 2013/0010964 A1* | 1/2013 | Fong | H04L 5/0053 380/277 |

(Continued)

FOREIGN PATENT DOCUMENTS

| | | |
|---|---|---|
| CN | 102217396 A | 10/2011 |
| CN | 102761826 A | 10/2012 |
| CN | 103428809 A | 12/2013 |

OTHER PUBLICATIONS

International Search Report dated Sep. 6, 2017 for International Application No. PCT/CN2017/088102, 4 pages.

(Continued)

*Primary Examiner* — Ernest G Tacsik
(74) *Attorney, Agent, or Firm* — Knobbe Martens Olson & Bear LLP

(57) ABSTRACT

Provided are a method and a device for determining a carrier for bearing a paging message and sending a paging message. The method for determining a carrier for bearing a paging message can comprise: acquiring, from a paging message sent by a mobility management entity (MME) or information locally stored by a base station, a paging characteristic of a terminal, where the paging characteristic indicates whether the terminal has the capability of supporting a non-anchor carrier for bearing the paging message; and (Continued)

determining a carrier for bearing the paging message corresponding to the terminal according to the paging characteristic.

17 Claims, 13 Drawing Sheets

(56) References Cited

U.S. PATENT DOCUMENTS

| | | |
|---|---|---|
| 2015/0078239 A1 | 3/2015 | Ahmadvand et al. |
| 2016/0198398 A1* | 7/2016 | Chen .................... H04W 48/18 370/329 |
| 2016/0295549 A1* | 10/2016 | Sebire ................... H04W 68/02 |
| 2017/0181124 A1 | 6/2017 | Zhu et al. |
| 2017/0230935 A1* | 8/2017 | Xu ....................... H04W 68/005 |
| 2019/0342852 A1* | 11/2019 | Marco ............... H04W 72/0453 |

OTHER PUBLICATIONS

Sequans Communications. "Paging on a non-anchor carrier" 3GPP TSG-RAN WG2 #96 R2-165553, Aug. 26, 2016, section 3.3.
ZTE. "Considerations on multiple carriers operation for NB-IoT" 3GPP TSG RAN WG1 Meeting #84 R1-160472, Feb. 19, 2016, section 2.

* cited by examiner

METHOD AND DEVICE FOR DETERMINING CARRIER FOR BEARING PAGING MESSAGE AND SENDING PAGING MESSAGE

CROSS-REFERENCES TO RELATED APPLICATIONS

This is a National Phase Application, filed under 35 U.S.C. 371, of International Patent Application No. PCT/CN2017/088102 filed on Jun. 13. 2017, which claims priority to Chinese patent application No. 201610495724.7 filed on Jun. 29, 2016, the entire disclosure of each of which is incorporated herein by reference.

TECHNICAL FIELD

The present disclosure relates to the field of wireless communications and, in particular, to a method and a device for determining a carrier for bearing a paging message and sending the paging message.

BACKGROUND

Machine to Machine (M2M) communications are an important topic of current researches in 5-th generation (5G) mobile communication technologies and an important application of wireless communications in the future. In the M2M topic, a research sub-topic of the Narrowband-Internet of Things (NB-IoT) has been proposed for a terminal with low costs and low throughput. That is, a low-throughput wireless communication service is provided for low-cost user equipment (UE) in the NB-IoT within a 200 kHz spectral bandwidth.

Considering the small capacity of a single-carrier cell within the 200 kHz spectral bandwidth, the access of a large number of NB-IoT terminals will inevitably lead to a restricted capacity. Therefore, the NB-IoT system introduces a multi-carrier cell, a cell including multiple 200 kHz carriers. Among the multiple 200 kHz carriers, only one carrier carries a Narrowband Physical Broadcast Channel (NPBCH)/Narrowband Primary Synchronization Signal (NPSS)/Narrowband Secondary Synchronization Signal (NSSS) and is referred to as an anchor carrier, and the other carriers are referred to as non-anchor carriers. It should be noted that the anchor carrier may also be referred to as an anchor carrier, and the non-anchor carrier may also be referred to as a non-anchor carrier. Current standards stipulate that the UE in an idle mode can only reside on the anchor carrier and an eNodeB can assign traffic to the non-anchor carrier via a fourth radio resource control (RRC) message or a subsequent RRC message according to the load of each carrier in the cell. A problem exists that a paging message can only be sent and received through the anchor carrier. Considering that the NB-IoT system mainly carries small data services of a large number of terminals which requires a large paging capacity, performing paging of all users in the multi-carrier cell on the anchor carrier will lead to a restricted paging capacity of the cell.

No effective solution has been provided to solve the problem in the existing art of the restricted paging capacity of the multi-carrier cell.

SUMMARY

The present disclosure provides a method and a device for determining a carrier for bearing a paging message and sending the paging message to solve at least the problem in a related art of a restricted paging capacity of a multi-carrier cell.

An embodiment of the present disclosure provides a method for determining a carrier for bearing a paging message, including: acquiring, from a paging message sent by a mobility management entity (MME) or information locally stored by a base station, a paging characteristic of a terminal, where the paging characteristic indicates whether the terminal has a capability of supporting a non-anchor carrier for bearing the paging message; and determining a carrier for bearing the paging message corresponding to the terminal according to the paging characteristic.

In the embodiment of the present disclosure, the determining a carrier for bearing the paging message corresponding to the terminal according to the paging characteristic includes: determining the carrier for bearing the paging message corresponding to the terminal to be an anchor carrier or the non-anchor carrier when the paging characteristic indicates that the terminal has the capability of supporting the non-anchor carrier for bearing the paging message; and determining the carrier for bearing the paging message corresponding to the terminal to be the anchor carrier when the paging characteristic indicates that the terminal has no capability of supporting the non-anchor carrier for bearing the paging message.

In the embodiment of the present disclosure, the determining the carrier for bearing the paging message corresponding to the terminal to be an anchor carrier or the non-anchor carrier includes: determining, according to a preset correspondence between a carrier capable of bearing the paging message in a cell where the terminal is located and a terminal identifier, the carrier for bearing the paging message corresponding to the terminal to be the anchor carrier or the non-anchor carrier.

In the embodiment of the present disclosure, before acquiring, from the paging message sent by the mobility management entity (MME), the paging characteristic of the terminal, the method further includes: sending indication information for indicating whether a cell where the terminal is located supports the non-anchor carrier for bearing the paging message to the MME via S1 interface signaling.

In the embodiment of the present disclosure, before acquiring, from the information locally stored by the base station, the paging characteristic of the terminal, the method further includes: acquiring the paging characteristic of the terminal from radio resource control (RRC) signaling reported by the terminal; and storing the paging characteristic of the terminal in the information locally stored by the base station.

In the embodiment of the present disclosure, the RRC signaling includes at least one of: an RRC connection request message, an RRC connection recovery request message, an RRC reestablishment request message, an RRC connection establishment complete message, an RRC connection recovery complete message or an RRC connection reestablishment complete message.

In the embodiment of the present disclosure, the paging characteristic of the terminal is indicated by at least one of: a cell, a bit in a cell, a paging type and a terminal type.

An embodiment of the present disclosure provides a method for sending a paging message, including: sending a paging message to a base station; where the paging message carries a paging characteristic of a terminal and the paging characteristic indicates whether the terminal has a capability of supporting a non-anchor carrier for bearing the paging message, and the paging characteristic is used by the base station for determining a carrier for bearing the paging message corresponding to the terminal.

In the embodiment of the present disclosure, before sending the paging message to the base station, the method further includes: determining whether the paging message sent to the base station carries the paging characteristic of the terminal.

In the embodiment of the present disclosure, the determining whether the paging message sent to the base station carries the paging characteristic of the terminal includes: determining, according to indication information and the paging characteristic of the terminal, whether the paging message carries the paging characteristic of the terminal. The indication information is acquired from the base station and used for indicating whether a cell where the terminal is located supports the non-anchor carrier for bearing the paging message. When the indication information indicates that the cell where the terminal is located supports the non-anchor carrier for bearing the paging message and the paging characteristic of the terminal indicates that the terminal has the capability of supporting the non-anchor carrier for bearing the paging message, it is determined that the paging message carries the paging characteristic of the terminal; and when the indication information indicates that the cell where the terminal is located supports the non-anchor carrier for bearing the paging message and the paging characteristic of the terminal indicates that the terminal has no capability of supporting the non-anchor carrier for bearing the paging message, it is determined that the paging message carries the paging characteristic of the terminal or not.

In the embodiment of the present disclosure, the paging message carrying the paging characteristic of the terminal includes: carrying the paging characteristic of the terminal through a specific indication domain in the paging message. When a value of the specific indication domain is a first value, the terminal has the capability of supporting the non-anchor carrier for bearing the paging message; and when the value of the specific indication domain is a second value, the terminal has no capability of supporting the non-anchor carrier for bearing the paging messages. The paging message sent to the base station carrying no paging characteristic of the terminal includes: having no specific indication domain in the paging message.

In the embodiment of the present disclosure, before sending the paging message to the base station, the method further includes: at a time of initial attach or a tracking area update of the terminal, acquiring the paging characteristic of the terminal through a non-access stratum (NAS) message or access stratum (AS) signaling sent by the terminal, or acquiring the paging characteristic of the terminal from subscription information of the terminal.

In the embodiment of the present disclosure, the NAS message includes at least one of: an attach request message and a tracking area update (TAU) request message.

In the embodiment of the present disclosure, the AS signaling includes at least one of: terminal capability information of an air interface and a terminal capability information indication of an S1 interface.

An embodiment of the present disclosure provides an device for determining a carrier for bearing a paging message, including: a first acquiring module, which is configured to acquire a paging characteristic of a terminal from a paging message sent by a mobility management entity (MME) or information locally stored by a base station; where the paging characteristic indicates whether the terminal has a capability of supporting a non-anchor carrier for bearing the paging message; and a determining module, which is configured to determine a carrier for bearing the paging message corresponding to the terminal according to the paging characteristic.

In the embodiment of the present disclosure, the determining module is further configured to determine the carrier for bearing the paging message corresponding to the terminal to be an anchor carrier or the non-anchor carrier when the paging characteristic indicates that the terminal has the capability of supporting the non-anchor carrier for bearing the paging message, and determine the carrier for bearing the paging message corresponding to the terminal to be the anchor carrier when the paging characteristic indicates that the terminal has no capability of supporting the non-anchor carrier for bearing the paging message.

In the embodiment of the present disclosure, the determining module is further configured to determine, according to a preset correspondence between a carrier capable of bearing the paging message in a cell where the terminal is located and a terminal identifier, the carrier for bearing the paging message corresponding to the terminal to be the anchor carrier or the non-anchor carrier.

In the embodiment of the present disclosure, the device further includes a sending module, which is configured to send indication information for indicating whether a cell where the terminal is located supports the non-anchor carrier for bearing the paging message to the MME via S1 interface signaling.

In the embodiment of the present disclosure, the device further includes a second acquiring module, which is configured to acquire the paging characteristic of the terminal from radio resource control (RRC) signaling reported by the terminal; and a storage module, which is configured to store the paging characteristic of the terminal in the information.

In the embodiment of the present disclosure, the RRC signaling includes at least one of: an RRC connection request message, an RRC connection recovery request message, an RRC reestablishment request message, an RRC connection establishment complete message, an RRC connection recovery complete message or an RRC connection reestablishment complete message.

In the embodiment of the present disclosure, the paging characteristic of the terminal is indicated by at least one of: a cell, a bit in a cell, a paging type and a terminal type.

An embodiment of the present disclosure provides an device for sending a paging message, including: a sending module, which is configured to send a paging message to a base station; where the paging message carries a paging characteristic of a terminal and the paging characteristic indicates whether the terminal has a capability of supporting a non-anchor carrier for bearing the paging message and is used by the base station for determining a carrier for bearing the paging message corresponding to the terminal.

In the embodiment of the present disclosure, the device further includes a determining module, which is configured to determine whether the paging message sent to the base station carries the paging characteristic of the terminal.

In the embodiment of the present disclosure, the determining module is further configured to determine, according to indication information and the paging characteristic of the terminal, whether the paging message sent to the base station carries the paging characteristic of the terminal. The indication information is acquired from the base station and used for indicating whether a cell where the terminal is located supports the non-anchor carrier for bearing the paging message. The determining module is configured to determine that the paging message carries the paging characteristic of the terminal when the indication information indicates that the cell where the terminal is located supports the non-anchor carrier for bearing the paging message and the paging characteristic of the terminal indicates that the terminal has the capability of supporting the non-anchor carrier for bearing the paging message; and the determining module is configured to determine that the paging message carries the paging characteristic of the terminal or not when the indication information indicates that the cell where the terminal is located supports the non-anchor carrier for bearing the paging message and the paging characteristic of the terminal indicates that the terminal has no capability of supporting the non-anchor carrier for bearing the paging message.

In the embodiment of the present disclosure, the paging message carrying the paging characteristic of the terminal includes: carrying the paging characteristic of the terminal using a specific indication domain in the paging message. When a value of the specific indication domain is a first value, the terminal has the capability of supporting the non-anchor carrier for bearing the paging message; and when the value of the specific indication domain is a second value, the terminal has no capability of supporting the non-anchor carrier for bearing the paging messages. The paging message carrying no paging characteristic of the terminal includes: having no specific indication domain in the paging message.

In the embodiment of the present disclosure, the device further includes an acquiring module, which is configured to acquire the paging characteristic of the terminal through a non-access stratum (NAS) message or access stratum (AS) signaling sent by the terminal or acquire the paging characteristic of the terminal from subscription information of the terminal at a time of initial attach or a tracking area update of the terminal.

In the embodiment of the present disclosure, the NAS message includes at least one of: an attach request message and a tracking area update (TAU) request message.

In the embodiment of the present disclosure, the AS signaling includes at least one of: terminal capability information of an air interface and a terminal capability information indication of an S1 interface.

An embodiment of the present disclosure provides a base station, including the device for determining the carrier for bearing the paging message.

An embodiment of the present disclosure provides a mobility management entity (MME), including the device for sending the paging message described above.

An embodiment of the present disclosure provides a system, including: the base station, the MMA and the terminal. The terminal is configured to report a paging characteristic of the terminal to the MME through a non-access stratum (NAS) message or access stratum (AS) signaling at a time of initial attach or a tracking area update, or report the paging characteristic of the terminal to the base station via radio resource control (RRC) signaling in an RRC establishment process. The paging characteristic indicates whether the terminal has a capability of supporting a non-anchor carrier for bearing a paging message.

In the embodiment of the present disclosure, the terminal is further configured to determine a carrier for receiving a paging message sent by the base station according to the paging characteristic of the terminal, a carrier capable of bearing the paging message in a cell where the terminal is located and a terminal identifier.

Another embodiment of the present disclosure provides a storage medium. The storage medium includes stored programs which, when executed, execute the method of any one of the embodiments described above.

Another embodiment of the present disclosure provides a processor. The processor is configured to execute programs, which, when executed, execute the method of any one of the embodiments described above.

When the present disclosure is used, the paging characteristic of the terminal is acquired from the paging message sent by the MME or the information locally stored by the base station to enable the paging characteristic of the terminal to be acquired so that the carrier for bearing the paging message corresponding to the terminal may be determined according to the paging characteristic. In this way, paging messages of different terminals in a cell may be shared by determined carriers, thereby solving the problem in the existing art of a restricted paging capacity of a multi-carrier cell and improving the paging capacity of the multi-carrier cell.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and not to limit the present disclosure in any improper way. In the drawings.

DETAILED DESCRIPTION

Hereinafter the present disclosure will be described in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

In the embodiments of the present application, a method for improving a paging capacity is to enable a non-anchor carrier to carry a paging message, and paging messages of different terminals in a multi-carrier cell may be borne by an anchor carrier and a non-anchor carrier. However, after a characteristic that the non-anchor carrier bears the paging message is introduced, an eNodeB supporting the characteristic may correspond to UE that supports the characteristic and UE that does not support the characteristic. When the eNodeB sends a paging message to a UE, the eNodeB needs to determine whether the UE supports the characteristic before the eNodeB determines to send the paging message to the UE on which carrier in the multi-carrier cell. However, since the paging message is a first air interface message in a call connection process, the eNodeB cannot acquire the paging characteristic that the non-anchor carrier bears the paging message of the UE when it sends the paging message. Therefore, the present disclosure provides a method for determining a carrier for bearing a paging message.

Figure 1:
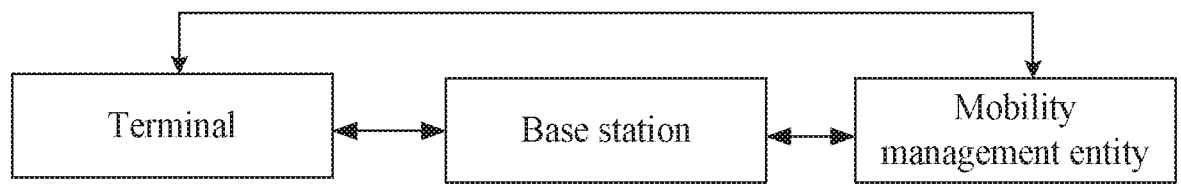
FIG. 1 is a schematic diagram of network architecture according to an embodiment of the present disclosure.

A method in the embodiments of the present application may be executed on network architecture shown in FIG. 1. As shown in FIG. 1, the network architecture includes a terminal, a base station and a mobility management entity (MME). The terminal may interact with the base station and the MME, and the base station may interact with the MME.

Figure 2:
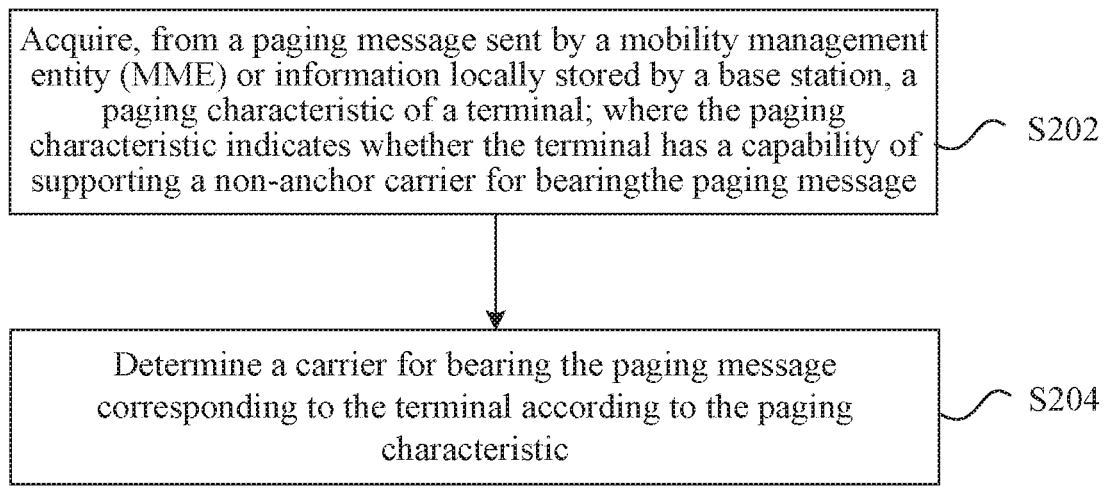
FIG. 2 is a flowchart of a method for determining a carrier for bearing a paging message according to an embodiment of the present disclosure.

This embodiment provides a method for determining a carrier for bearing a paging message and executed on the network architecture described above. FIG. 2 is a flowchart of a method for determining a carrier for bearing a paging message according to an embodiment of the present disclosure. As shown in FIG. 2, the method includes the steps described below.

In step S202, a paging characteristic of a terminal is acquired from a paging message sent by a mobility management entity (MME) or information locally stored by a base station, where the paging characteristic indicates whether the terminal has a capability of supporting a non-anchor carrier for bearing the paging message.

In step S204, a carrier for bearing the paging message corresponding to the terminal is determined according to the paging characteristic.

In the above steps, the paging characteristic of the terminal is acquired from the paging message sent by the MME or the information locally stored by the base station to enable the paging characteristic of the terminal to be acquired so that the carrier for bearing the paging message corresponding to the terminal may be determined according to the paging characteristic. In this way, paging messages of different terminals in a cell may be shared by determined carriers, thereby solving the problem in the related art of a restricted paging capacity of a multi-carrier cell and improving the paging capacity of the multi-carrier cell.

It is to be noted that the step of acquiring the paging characteristic of the terminal from the paging message sent by the mobility management entity (MME) may be executed as follows: the paging message carries the paging characteristic of the terminal; after the paging message is acquired, information in the paging message is parsed to acquire the paging characteristic of the terminal, but it is not limited thereto.

It is to be noted that the above step S204 may be executed as follows: when the paging characteristic indicates that the terminal has the capability of supporting the non-anchor carrier for bearing the paging message, the carrier for bearing the paging message corresponding to the terminal is determined to be an anchor carrier or the non-anchor carrier; and when the paging characteristic indicates that the terminal has no capability of supporting the non-anchor carrier for bearing the paging message, the carrier for bearing the paging message corresponding to the terminal is determined to be the anchor carrier. The paging characteristic of the terminal is used for determining which carrier bears the paging message to enable the non-anchor carrier to share paging messages borne on part of the anchor carriers so that paging of all users will not be concentrated on the anchor carrier, avoiding the problem of the restricted capacity of the cell.

It is to be noted that one cell may have multiple non-anchor carriers so that which non-anchor carrier or which non-anchor carriers bear the paging message of the terminal is further to be determined. Therefore, in one embodiment of the present disclosure, the step of determining the carrier for bearing the paging message corresponding to the terminal to be the anchor carrier or the non-anchor carrier includes determining, according to a preset correspondence between a carrier capable of bearing the paging message in a cell where the terminal is located and a terminal identifier, the carrier for bearing the paging message corresponding to the terminal to be the anchor carrier or the non-anchor carrier.

The above mentioned correspondence may be expressed as follows, but is not limited thereto: the terminal identifier is divided by a number of carriers capable of bearing the paging message and a value obtained by the division is used as a carrier number corresponding to the terminal identifier. In this case, the determined carrier for bearing the paging message corresponding to the terminal is a carrier corresponding to the carrier number; if the carrier is the anchor carrier, the determined carrier for bearing the paging message corresponding to the terminal is the anchor carrier; and if the carrier is the non-anchor carrier, the determined carrier for bearing the paging message corresponding to the terminal is the non-anchor carrier.

It is to be noted that before the paging characteristic of the terminal is acquired, it should also be known whether the cell where the terminal is located supports the non-anchor carrier for bearing the paging message, which means that it has more significance to acquire the paging characteristic of the terminal when the cell where the terminal is located supports the non-anchor carrier for bearing the paging message. Therefore, in the case where the paging characteristic of the terminal is acquired from the paging message sent by the MME, in one embodiment of the present disclosure, before the step S202, the method may further include sending indication information for indicating whether the cell where the terminal is located supports the non-anchor carrier for bearing the paging message to the MME via S1 interface signaling. The indication information is sent to the MME to enable the MME to determine whether to carry the paging characteristic of the terminal in the paging message sent to the base station. For example, in the case where the indication information indicates that the cell where the terminal is located does not support the non-anchor carrier for bearing the paging message, it does not matter whether the paging message sent by the MME to the base station carries the paging characteristic of the terminal or not; in the case where the indication information indicates that the cell where the terminal is located supports the non-anchor carrier for bearing the paging message, the paging message sent by the MME to the base station carries the paging characteristic of the terminal. However, it is not limited thereto.

It is to be noted that the S1 interface signaling may be an S1 establishment request message or a configuration update message of the base station, but it is not limited thereto.

In one embodiment of the present disclosure, in the case where the paging characteristic of the terminal is acquired from the information locally stored by the base station, before the step S202, the method may further include acquiring, from radio resource control (RRC) signaling reported by the terminal, the paging characteristic of the terminal; and storing the paging characteristic of the terminal in the information. The paging characteristic of the terminal is stored in the information of the base station for subsequent use.

It is to be noted that the RRC signaling may include, but is not limited to, at least one of an RRC connection request message, an RRC connection recovery request message, an RRC reestablishment request message, an RRC connection establishment complete message, an RRC connection recovery complete message or an RRC connection reestablishment complete message.

It is to be noted that the paging characteristic of the terminal may be indicated by at least one of: a cell, a bit in a cell, a paging type and a terminal type.

In one embodiment, the paging characteristic of the terminal may be represented by a single cell or by a value of some bit in a cell; and may be represented explicitly or implicitly. For example, some indication domain with a value of 1 indicates that the UE supports the characteristic that the non-anchor carrier bears the paging message and some indication domain with a value of 0 indicates that the UE does not support the characteristic that the non-anchor carrier bears the paging message. Alternatively, the signaling including some indication domain with a value of "TRUE" indicates that the UE supports the characteristic that the non-anchor carrier bears the paging message and the signaling including no indication domain indicates that the UE does not support the characteristic that the non-anchor carrier bears the paging message. Alternatively, different types of UEs implicitly indicate whether the UE supports the non-anchor carrier for bearing the paging message. Alternatively, the paging type indicates whether the UE supports the non-anchor carrier for bearing the paging message (for example, a paging type 1 is regular paging and only supports the anchor carrier for bearing paging information, and a paging type 2 is multi-carrier cell paging and supports the anchor carrier and non-anchor carrier for bearing the paging information).

It is to be noted that the above steps may be executed by the base station in FIG. 1. Specifically, the base station may be, but is not limited to, a base station that supports the non-anchor carrier for bearing the paging message.

It is to be noted that the method described above may be applied to an NB-IoT system, but it is not limited thereto.

From the description of the embodiments described above, it will be apparent to those skilled in the art that the method in the embodiments described above may be implemented by software plus a necessary general-purpose hardware platform, or may of course be implemented by hardware, but in many cases, the former is a preferred implementation mode. Based on this understanding, the solutions provided by the present disclosure substantially, or the part contributing to the existing art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment 2

Figure 3:
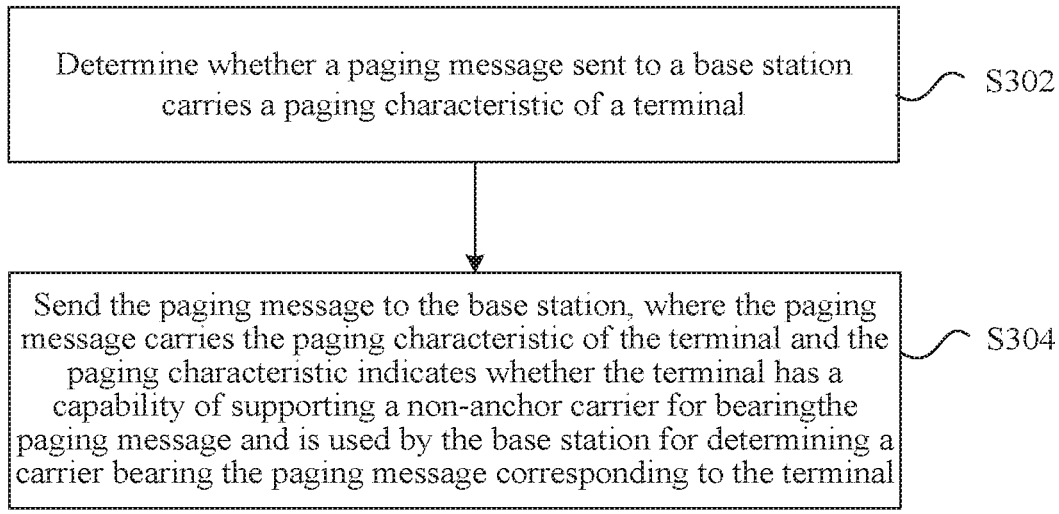
FIG. 3 is a flowchart of a method for sending a paging message according to an embodiment of the present disclosure.

A method in the embodiments of the present application may also be executed on the network architecture shown in FIG. 1. This embodiment provides a method for sending a paging message and executed on the network architecture described above. FIG. 3 is a flowchart of a method for sending a paging message according to an embodiment of the present disclosure. As shown in FIG. 3, the method includes the steps described below.

In step S302, it is determined whether a paging message sent to a base station carries a paging characteristic of a terminal.

In step S304, the paging message is sent to the base station. The paging message carries the paging characteristic of the terminal and the paging characteristic indicates whether the terminal has a capability of supporting a non-anchor carrier for bearing the paging message. The paging characteristic is used by the base station for determining a carrier for bearing the paging message corresponding to the terminal.

In the above steps, the paging characteristic of the terminal is carried in the paging message sent to the base station to enable the base station to acquire the paging characteristic of the terminal when the base station acquires the paging message so that the carrier for bearing the paging message corresponding to the terminal may be determined according to the paging characteristic. In this way, paging messages of different terminals in a cell may be shared by determined carriers, thereby solving the problem in the related art of a restricted paging capacity of a multi-carrier cell and improving the paging capacity of the multi-carrier cell.

It is to be noted that whether the paging message sent to the base station carries the paging characteristic of the terminal needs to be further determined. The paging characteristic of the terminal may not be carried when there is no need. Therefore, in one embodiment of the present disclosure, the step S302 may include determining, according to indication information and the paging characteristic of the terminal, whether the paging message sent to the base station carries the paging characteristic of the terminal. The indication information is acquired from the base station and configured for indicating whether a cell where the terminal is located supports the non-anchor carrier for bearing the paging message. When the indication information indicates that the cell where the terminal is located supports the non-anchor carrier for bearing the paging message and the paging characteristic of the terminal indicates that the terminal has the capability of supporting the non-anchor carrier for bearing the paging message, it is determined that the paging message carries the paging characteristic of the terminal. When the indication information indicates the cell where the terminal is located supports the non-anchor carrier for bearing the paging message and the paging characteristic of the terminal indicates that the terminal has no capability of supporting the non-anchor carrier for bearing the paging message, it is determined that the paging message carries the paging characteristic of the terminal or not.

It is to be noted that the paging message carrying the paging characteristic of the terminal includes: carrying the paging characteristic of the terminal through a specific indication domain in the paging message. When a value of the specific indication domain is a first value, the terminal has the capability of supporting the non-anchor carrier for bearing the paging message; and when the value of the specific indication domain is a second value, the terminal has no capability of supporting the non-anchor carrier for bearing the paging messages. The paging message carrying no paging characteristic of the terminal includes: having no specific indication domain in the paging message.

It is to be noted that when the indication information indicates that the cell where the terminal is located does not support the non-anchor carrier for bearing the paging message, it is determined that the paging message sent to the base station carries no paging characteristic of the terminal. It is to be noted that the above step S304 may be independent of the step S302, that is, the step S304 may be executed separately or executed together with the step S302. However, it is not limited thereto.

In one embodiment of the present disclosure, before the step S304, the method may further include: at the time of initial attach or a tracking area update of the terminal, acquiring the paging characteristic of the terminal through a non-access stratum (NAS) message or access stratum (AS) signaling sent by the terminal, or acquiring the paging characteristic of the terminal from subscription information of the terminal.

It is to be noted that after the paging characteristic of the terminal is acquired through the non-access stratum (NAS) message or the access stratum (AS) signaling sent by the terminal, the method may further include storing the acquired paging characteristic of the terminal.

It is to be noted that the NAS message may include, but is not limited to, at least one of: an attach request message and a tracking area update (TAU) request message. The AS signaling may include, but is not limited to, at least one of: terminal capability information of an air interface and a terminal capability information indication of an S1 interface.

It is to be noted that the paging characteristic of the terminal may be indicated by at least one of: a cell, a bit in a cell, a paging type and a terminal type.

In one embodiment, the paging characteristic of the terminal may be represented by a single cell or by a value of some bit in a cell; and may be represented explicitly or implicitly. For example, some indication domain with a value of 1 indicates that the UE supports the characteristic that the non-anchor carrier bears the paging message and some indication domain with a value of 0 indicates that the UE does not support the characteristic that the non-anchor carrier bears the paging message. Alternatively, the signaling including some indication domain with a value of "TRUE" indicates that the UE supports the characteristic that the non-anchor carrier bears the paging message and the signaling including no indication domain indicates that the UE does not support the characteristic that the non-anchor carrier bears the paging message. Alternatively, different types of UEs implicitly indicate whether the UE supports the non-anchor carrier for bearing the paging message. Alternatively, the paging type indicates whether the UE supports the non-anchor carrier for bearing he paging message (for example, a paging type 1 is regular paging and only supports the anchor carrier for bearing paging information, and a paging type 2 is multi-carrier cell paging and supports the anchor carrier and non-anchor carrier for bearing the paging information).

It is to be noted that the above steps may be executed by the mobility management entity (MME). Specifically, the MME may be, but is not limited to, an MME in the network architecture shown in FIG. 1.

It is to be noted that the method described above may be applied to an NB-IoT system, but it is not limited thereto.

From the description of the embodiments described above, it will be apparent to those skilled in the art that the method in the embodiments described above may be implemented by software plus a necessary general-purpose hardware platform, or may of course be implemented by hardware, but in many cases, the former is a preferred implementation mode. Based on this understanding, the solutions provided by the present disclosure substantially, or the part contributing to the existing art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

To better understand the embodiment 1 and the embodiment 2 of the present disclosure, the present disclosure will be further described below in conjunction with preferred embodiments.

A technical problem to be solved in the preferred embodiments of the present disclosure is to propose a method to help an eNodeB acquire a paging characteristic of a UE that a non-anchor carrier bears a paging message in an NB-IoT system. The method may solve the problem that the eNodeB cannot acquire the paging characteristic of the UE that the non-anchor carrier bears the paging message when the eNodeB sends the paging message.

The method proposed by the preferred embodiments of the present disclosure and used by the eNodeB for acquiring the paging characteristic of the UE that the non-anchor carrier bears the paging message includes the steps described below.

At the time of initial attach and a tracking area update (TAU), the UE reports the paging characteristic of the UE that the non-anchor carrier bears the paging message to a mobility management entity (MME) through a non-access stratum (NAS) message or access stratum (AS) signaling. When the MME initiates paging, the paging message carrying the paging characteristic of the UE that the non-anchor carrier bears the paging message is sent to the eNodeB. The eNodeB parses the information in the paging message to acquire the paging characteristic of the UE that the non-anchor carrier bears the paging message and selects paging carriers in a multi-carrier cell according to an acquired capability. The NAS message may be an attach request message and a TAU request message. The AS signaling may be "UE capability information" of an air interface and "UE capability information indication" of an S1 interface.

In the preferred embodiments of the present disclosure, the eNodeB transmits an indication whether a cell supports the non-anchor carrier in sending the paging message to the MME via S1 interface signaling to enable the MME to determine whether the paging message sent to the eNodeB carries an indication that the UE supports the characteristic that the non-anchor carrier bears the paging message.

In the preferred embodiments of the present disclosure, the UE reports the paging characteristic of the UE that the non-anchor carrier bears the paging message to the eNodeB via RRC signaling; the eNodeB stores the paging characteristic of the UE that the non-anchor carrier bears the paging message at the time of an RRC connection release; and when the UE is paged again, the eNodeB selects the paging carriers in the multi-carrier cell according to the stored paging characteristic of the UE that the non-anchor carrier bears the paging message. The RRC signaling may be an RRC connection request, an RRC connection recovery request, an RRC reestablishment request, an RRC connection establishment completion, an RRC connection recovery completion or an RRC connection reestablishment completion.

The paging characteristic of the UE that the non-anchor carrier bears the paging message may be represented by a single cell or by a value of some bit in a cell; and may be represented explicitly or implicitly. For example, some indication domain with a value of 1 indicates that the UE supports the characteristic that the non-anchor carrier bears the paging message and some indication domain with a value of 0 indicates that the UE does not support the characteristic that the non-anchor carrier bears the paging message. Alternatively, the signaling including some indication domain with a value of "TRUE" indicates that the UE supports the characteristic that the non-anchor carrier bears the paging message and the signaling including no indication domain indicates that the UE does not support the characteristic that the non-anchor carrier bears the paging message. Alternatively, different types of UEs implicitly indicate whether the UE supports the non-anchor carrier for bearing the paging message. Alternatively, the paging type indicates whether the UE supports the non-anchor carrier for bearing the paging message (for example, a paging type 1 is regular paging and only supports an anchor carrier for bearing paging information, and a paging type 2 is multi-carrier cell paging and supports the anchor carrier and non-anchor carrier for bearing the paging information).

Figure 4:
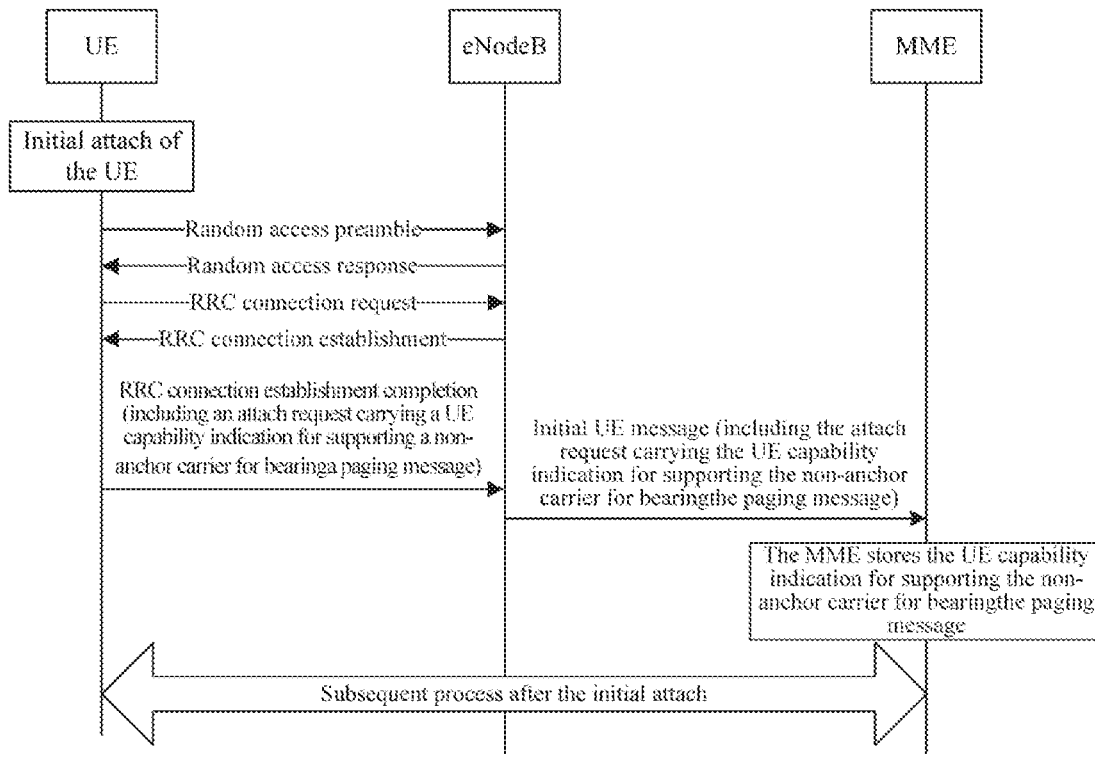
FIG. 4 is a flowchart of an initial attach process of a UE according to a preferred embodiment of the present disclosure.

FIG. 4 is a flowchart of an initial attach process of a UE according to a preferred embodiment of the present disclosure. In the preferred embodiment of the present disclosure shown in FIG. 4, the UE reports an indication of the UE for the paging characteristic that the non-anchor carrier bears the paging message to the MME through the NAS message. As shown in FIG. 4, the process includes the steps described below.

The UE includes an NAS protocol data unit (PDU) carrying an attach request in the RRC connection establishment complete message.

After the eNodeB receives the RRC connection establishment complete message, the eNodeB transmits the NAS PDU carrying the attach request to the MME with an initial UE message. The NAS PDU carrying the attach request carries the indication for the paging characteristic of the UE that the non-anchor carrier bears the paging message.

After the MME receives the NAS PDU carrying the attach request, the MME parses and stores the indication for the paging characteristic of the UE that the non-anchor carrier bears the paging message for use in subsequent paging.

Figure 5:
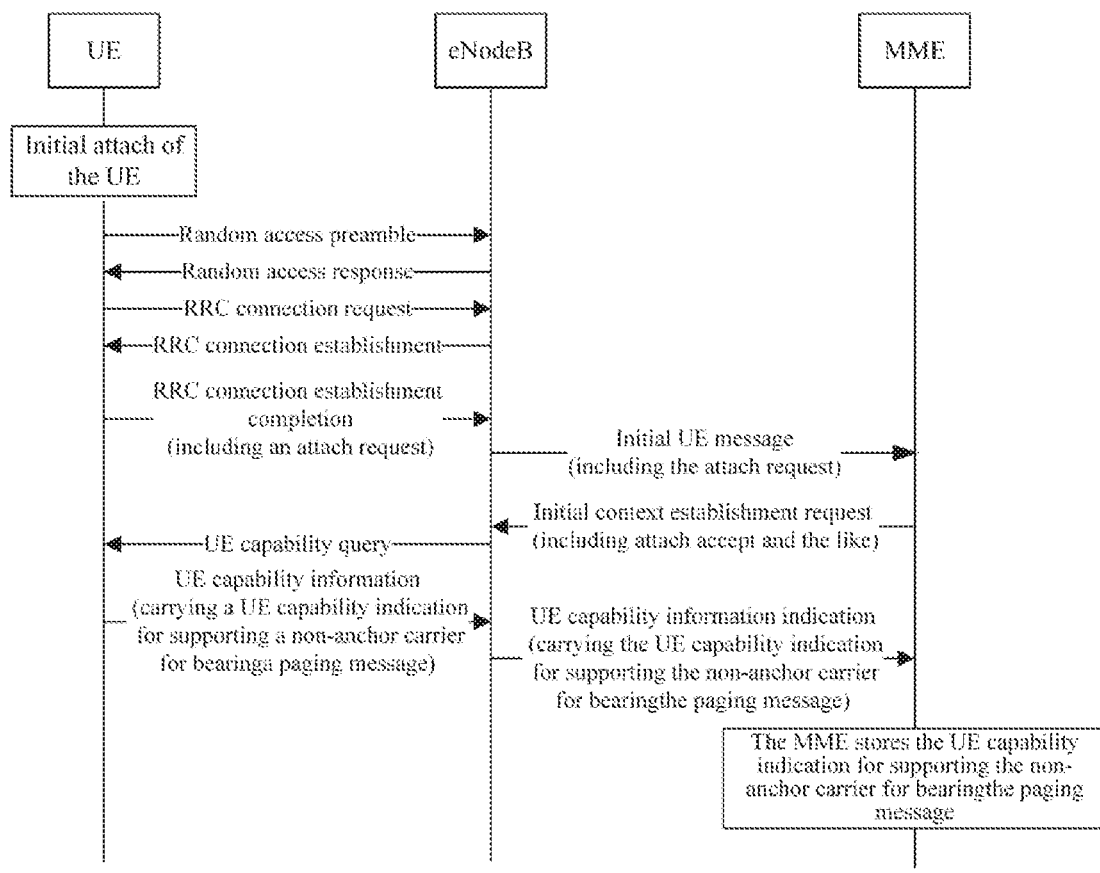
FIG. 5 is a flowchart of a UE capability query process triggered by an initial attach process of a UE according to a preferred embodiment of the present disclosure.

FIG. 5 is a flowchart of a UE capability query process triggered by an initial attach process of a UE according to a preferred embodiment of the present disclosure. The preferred embodiment of the present disclosure shown in FIG. 5 provides an example in which the UE reports the indication for the paging characteristic of the UE that the non-anchor carrier bears the paging message to the MME via the AS signaling. As shown in FIG. 5, the process includes the steps described below.

The initial attach process of the UE triggers a UE capability query process initiated by the eNodeB in which the eNodeB sends a "UE capability query" message to the UE.

The UE reports its capability to the eNodeB with "UE capability information". The UE capability includes the indication for the paging characteristic of the UE that the non-anchor carrier bears the paging message.

The eNodeB reports the received UE capability to the MME with a "UE capability information indication". The UE capability includes the indication for the paging characteristic of the UE that the non-anchor carrier bears the paging message.

After the MME receives the "UE capability information indication", the MME parses and stores the indication for the paging characteristic of the UE that the non-anchor carrier bears the paging message for use in subsequent paging.

Figure 6:
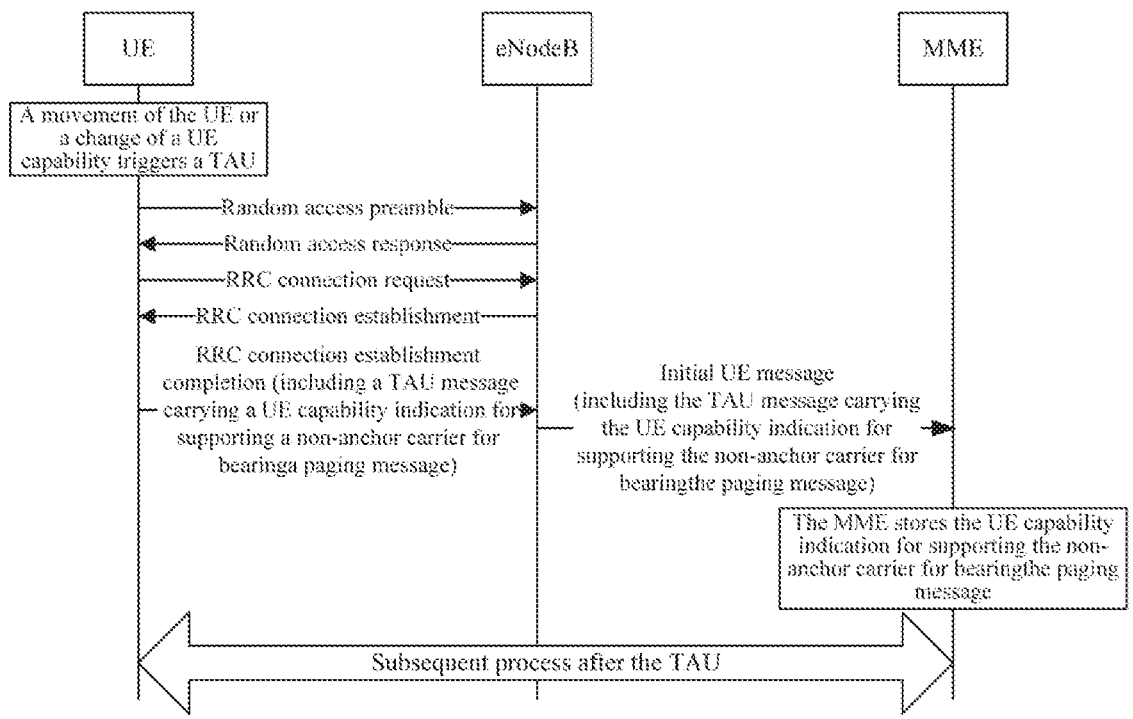
FIG. 6 is a flowchart of a TAU process in an idle mode according to a preferred embodiment of the present disclosure.

FIG. 6 is a flowchart of a TAU process in an idle mode according to a preferred embodiment of the present disclosure. The preferred embodiment of the present disclosure shown in FIG. 6 provides another example in which the UE reports the indication for the paging characteristic of the UE that the non-anchor carrier bears the paging message to the MME through the NAS message. The process includes the steps described below.

The UE includes an NAS PDU carrying a tracking area update (TAU) in the RRC connection establishment complete message. The NAS PDU carrying the TAU carries the indication for the paging characteristic of the UE that the non-anchor carrier bears the paging message.

After the eNodeB receives the RRC connection establishment complete message, the eNodeB transmits the NAS PDU carrying the TAU to the MME through the initial UE message. The NAS PDU carrying the TAU carries the indication for the paging characteristic of the UE that the non-anchor carrier bears the paging message.

After the MME receives the NAS PDU carrying the TAU, the MME parses and stores the indication for the paging characteristic of the UE that the non-anchor carrier bears the paging message for use in subsequent paging.

Figure 7:
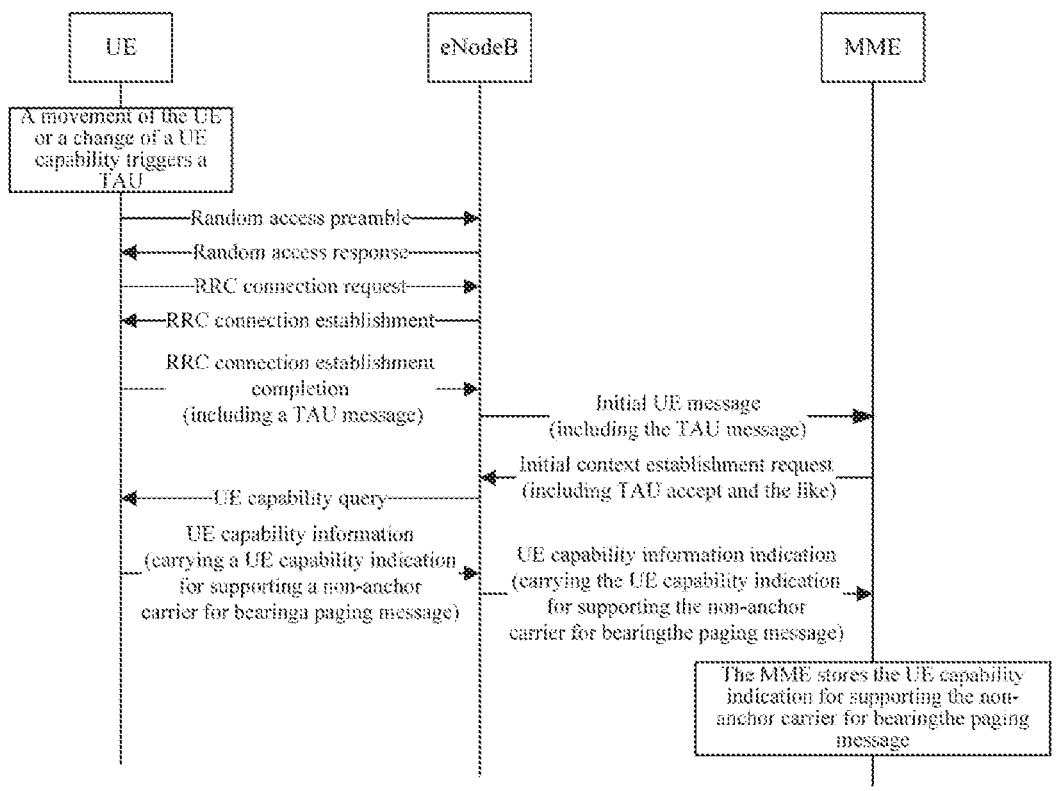
FIG. 7 is a flowchart of a TAU process in an idle mode according to a preferred embodiment of the present disclosure.

FIG. 7 is a flowchart of a TAU process in an idle mode according to a preferred embodiment of the present disclosure. The preferred embodiment of the present disclosure shown in FIG. 7 provides another example in which the UE reports the indication for the paging characteristic of the UE that the non-anchor carrier bears the paging message to the MME via the AS signaling. The process includes the steps described below.

The TAU process of the UE triggers the UE capability query process initiated by the eNodeB in which the eNodeB sends the "UE capability query" message to the UE.

The UE reports its capability to the eNodeB through the "UE capability information". The UE capability includes the indication for the paging characteristic of the UE that the non-anchor carrier bears the paging message.

The eNodeB reports the received UE capability to the MME through the "UE capability information indication". The UE capability includes the indication for the paging characteristic of the UE that the non-anchor carrier bears the paging message.

After the MME receives the "UE capability information indication", the MME parses and stores the indication for the paging characteristic of the UE that the non-anchor carrier bears the paging message for use in subsequent paging.

Figure 8:
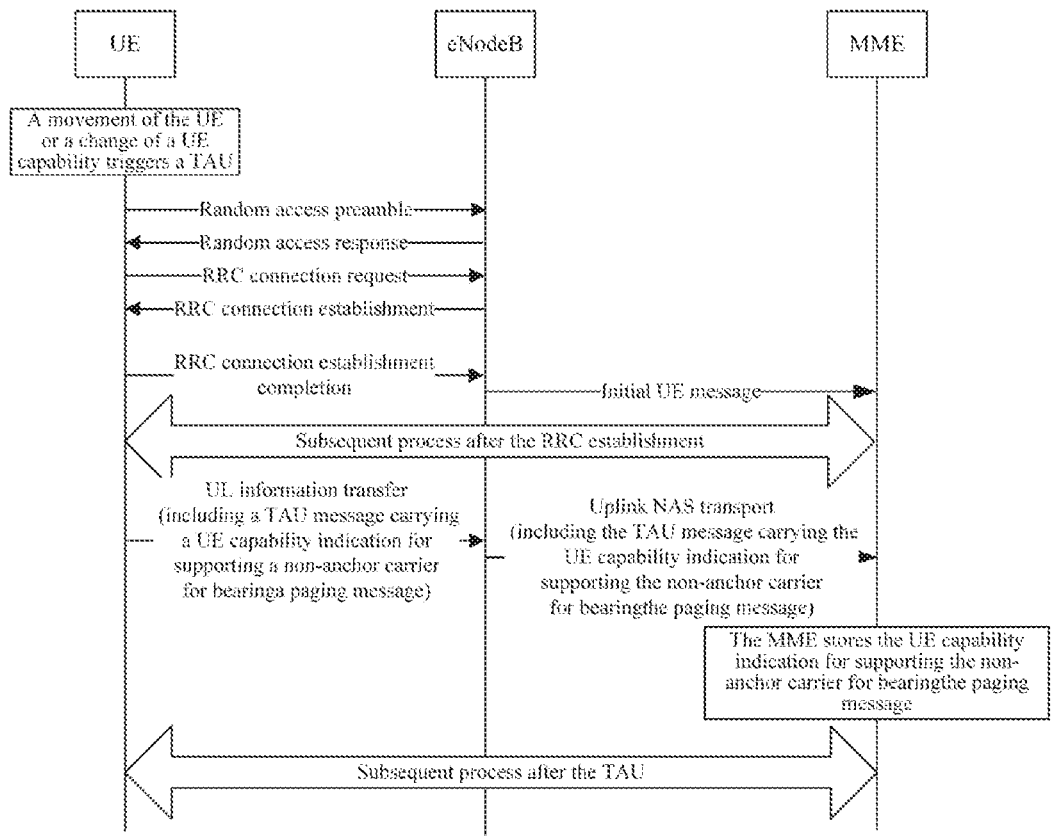
FIG. 8 is a flowchart of a TAU process in a connected mode according to a preferred embodiment of the present disclosure.

FIG. 8 is a flowchart of a TAU process in a connected mode according to a preferred embodiment of the present disclosure. The preferred embodiment of the present disclosure shown in FIG. 8 provides yet another example in which the UE reports the indication for the paging characteristic of the UE that the non-anchor carrier bears the paging message to the MME through the NAS message. The process includes the steps described below.

After the RRC connection establishment is complete, the UE includes the NAS PDU carrying the tracking area update (TAU) in an uplink (UL) information transfer message. The NAS PDU carrying the TAU carries the indication for the paging characteristic of the UE that the non-anchor carrier bears the paging message.

After the eNodeB receives the UL information transfer message, the eNodeB transmits the NAS PDU carrying the TAU to the MME with an uplink NAS transport message. The NAS PDU carrying the TAU carries the indication for the paging characteristic of the UE that the non-anchor carrier bears the paging message.

After the MME receives the NAS PDU carrying the TAU, the MME parses and stores the indication for the paging characteristic of the UE that the non-anchor carrier bears the paging message for use in subsequent paging.

Figure 9:
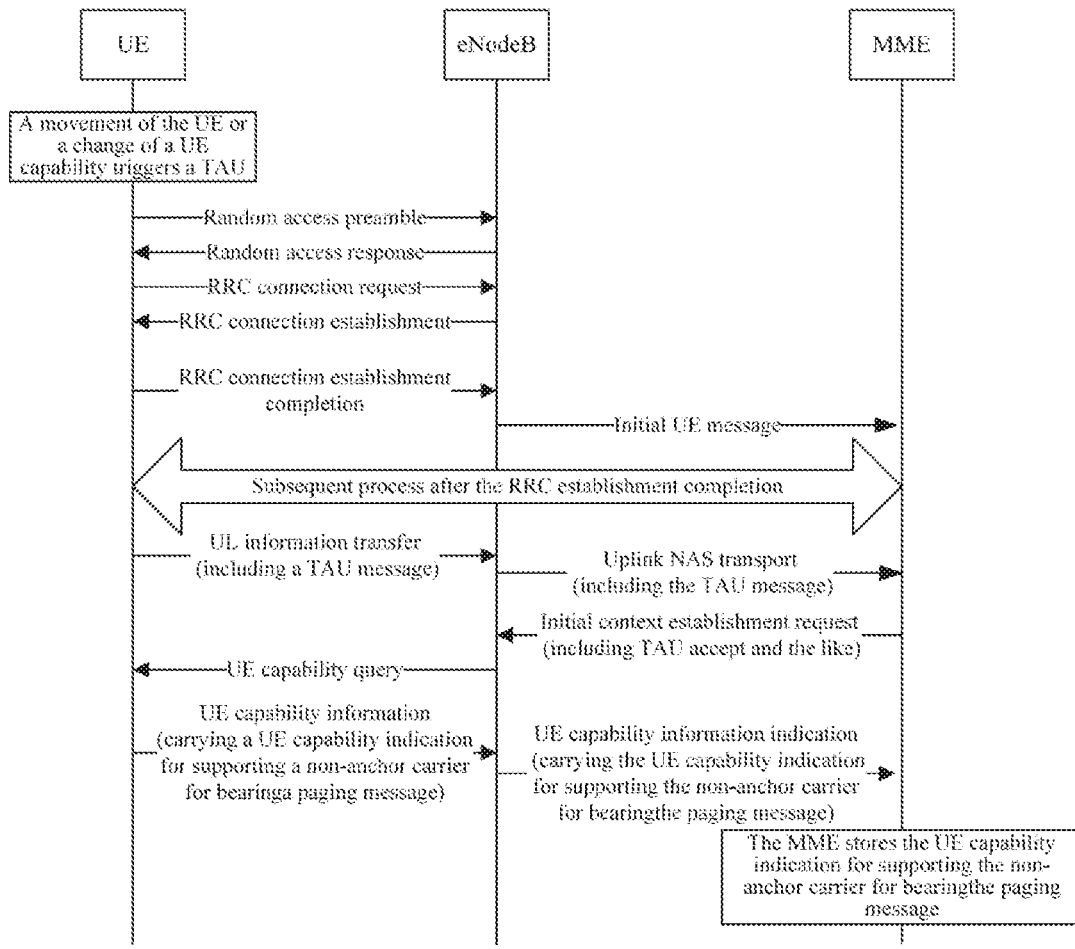
FIG. 9 is a flowchart of a UE capability query process triggered by a TAU process in a connected mode according to a preferred embodiment of the present disclosure.

FIG. 9 is a flowchart of a UE capability query process triggered by a TAU process in a connected mode according to a preferred embodiment of the present disclosure. The preferred embodiment of the present disclosure shown in FIG. 9 provides yet another example in which the UE reports the indication for the paging characteristic of the UE that the non-anchor carrier bears the paging message to the MME via the AS signaling. The process includes the steps described below.

The TAU process of the UE in the connected mode triggers the UE capability query process initiated by the eNodeB in which the eNodeB sends the "UE capability query" message to the UE.

The UE reports its capability to the eNodeB through "UE capability information". The UE capability includes the indication for the paging characteristic of the UE that the non-anchor carrier bears the paging message.

The eNodeB reports the received UE capability to the MME through the "UE capability information indication". The UE capability includes the indication for the paging characteristic of the UE that the non-anchor carrier bears the paging message.

After the MME receives the "UE capability information indication", the MME parses and stores the indication for the paging characteristic of the UE that the non-anchor carrier bears the paging message for use in subsequent paging.

Figure 10:
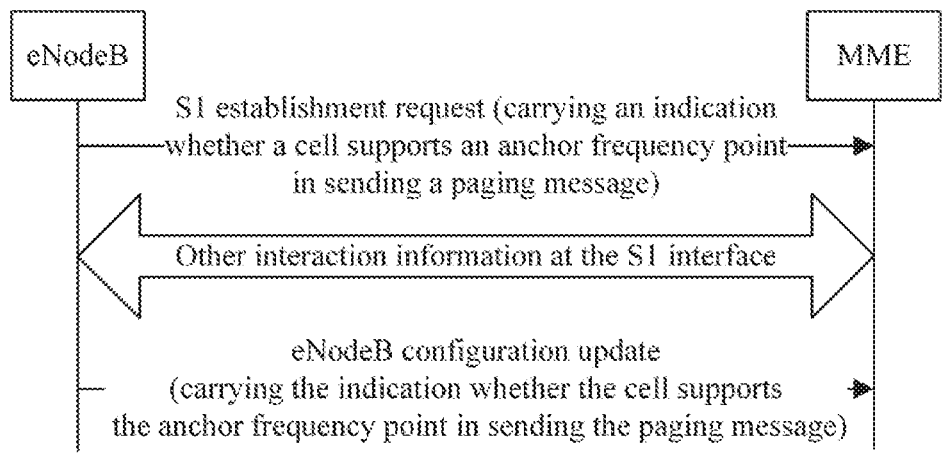
FIG. 10 is a schematic diagram of a base station reporting whether the base station has a capability of supporting a non-anchor carrier for bearing a paging message to an MME according to a preferred embodiment of the present disclosure.

FIG. 10 is a schematic diagram of a base station reporting whether the base station has a capability of supporting a non-anchor carrier for bearing a paging message to an MME according to a preferred embodiment of the present disclosure. As shown in FIG. 10, the preferred embodiment of the present disclosure provides an example in which the eNodeB reports whether the eNodeB supports the non-anchor carrier in sending the paging message. The process includes the steps described below.

The eNodeB transmits an indication whether the eNodeB supports the non-anchor carrier in sending the paging message to the MME via the S1 interface signaling to enable the MME to determine whether the paging message sent to the eNodeB carries the indication that the UE supports the characteristic that the non-anchor carrier bears the paging message. If the eNodeB supports the non-anchor carrier in sending the paging message, the MME carries the indication that the UE supports the characteristic that the non-anchor carrier bears the paging message in the paging message sent to the eNodeB; otherwise, the MME does not need to carry the indication that the UE supports the characteristic that the non-anchor carrier bears the paging message in the paging message sent to the eNodeB.

The S1 interface signaling via which the eNodeB reports the indication whether the eNodeB supports the non-anchor carrier in sending the paging message to the MME may be an "S1 establishment request" or an "eNodeB configuration update" message. The indication may be reported in cells or in eNodeBs. The indication may be represented by the single cell or by the value of some bit in the cell; and may be represented explicitly or implicitly. For example, some indication domain with the value of 1 indicates that the eNodeB supports the non-anchor carrier in sending the paging message and some indication domain with the value of 0 indicates that the eNodeB does not support the non-anchor carrier in sending the paging message. Alternatively, the signaling including some indication domain with the value of "TRUE" indicates that the eNodeB supports the non-anchor carrier in sending the paging message and the signaling including no indication domain indicates that the eNodeB does not support the non-anchor carrier in sending the paging message.

Figure 11:
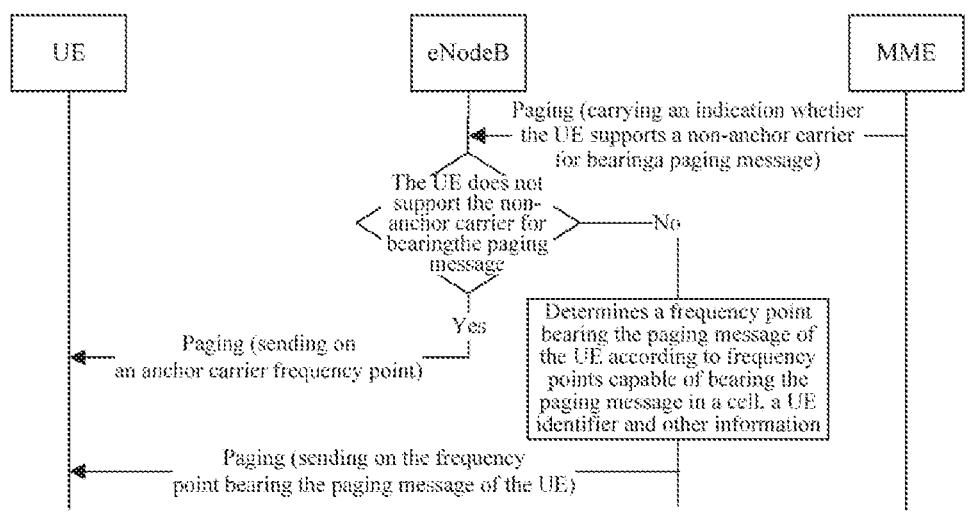
FIG. 11 is a flowchart of a method used by a base station for acquiring a paging characteristic of a terminal according to a preferred embodiment of the present disclosure.

FIG. 11 is a flowchart of a method used by a base station for acquiring a paging characteristic of a terminal according to a preferred embodiment of the present disclosure. As shown in FIG. 11, the preferred embodiment of the present disclosure provides an example in which the eNodeB acquires the paging characteristic of the UE that the non-anchor carrier bears the paging message from the paging message sent by the MME. The process includes the steps described below.

The paging message sent by the MME to the eNodeB carries the indication for the paging characteristic of the UE that the non-anchor carrier bears the paging message.

According to the indication for the paging characteristic of the UE that the non-anchor carrier bears the paging message carried in the received paging message, the eNodeB determines whether the UE supports the characteristic that the non-anchor carrier bears the paging message. If the UE does not support the characteristic, the eNodeB sends the paging message on the anchor carrier to the UE; otherwise, the eNodeB determines the carrier for bearing the paging message of the UE according to carriers capable of bearing the paging message in the cell, a UE identifier and other information, and sends the paging message on the carrier to the UE.

Figure 12:
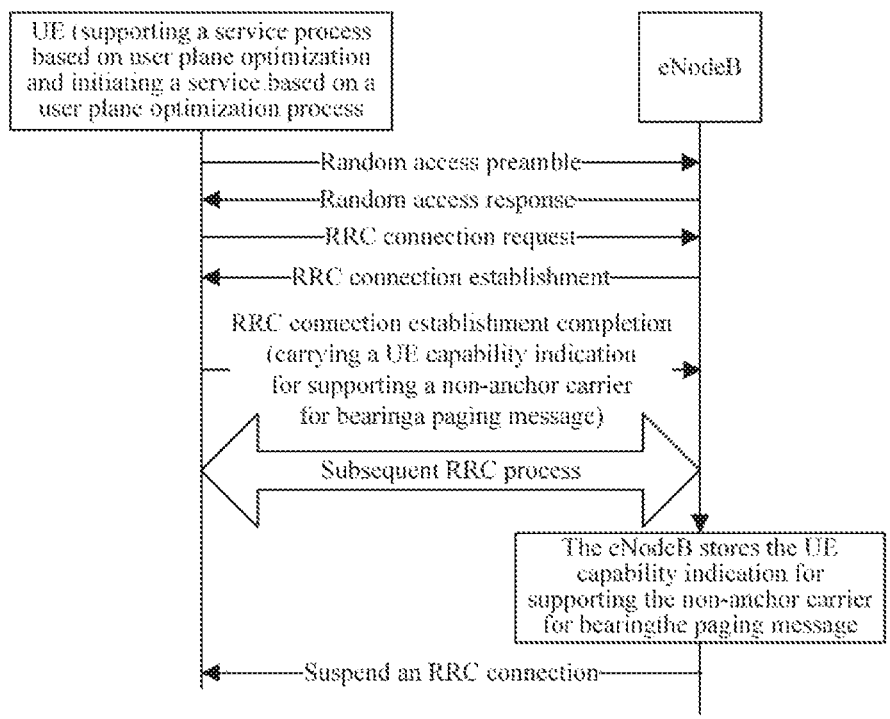
FIG. 12 is a flowchart of an RRC connection establishment process of a service based on a user plane optimization process and initiated by a UE supporting a service process based on user plane optimization according to a preferred embodiment of the present disclosure.

FIG. 12 is a flowchart of an RRC connection establishment process of a service based on a user plane optimization process and initiated by a UE supporting a service process based on user plane optimization according to a preferred embodiment of the present disclosure. As shown in FIG. 12, the preferred embodiment of the present disclosure provides an example in which the UE reports the paging characteristic of the UE that the non-anchor carrier bears the paging message to the eNodeB via the RRC signaling. The process includes the steps described below.

The UE carries the indication for the paging characteristic of the UE that the non-anchor carrier bears the paging message in the RRC establishment complete message.

When the eNodeB determines to suspend an RRC connection, a UE context and the indication for the paging characteristic of the UE that the non-anchor carrier bears the paging message are stored.

The service process based on the user plane optimization refers to a service process introduced for signaling optimization of small data services in the NB-IoT system in which the terminal and a network use a data radio bearer (DRB) for transmitting data and store information such as a bearer information context and an access stratum (AS) security context to suspend the RRC connection after data transmission. When the data is sent again, the terminal and the network restore the RRC connection to quickly restore the DRB for use.

Figure 13:
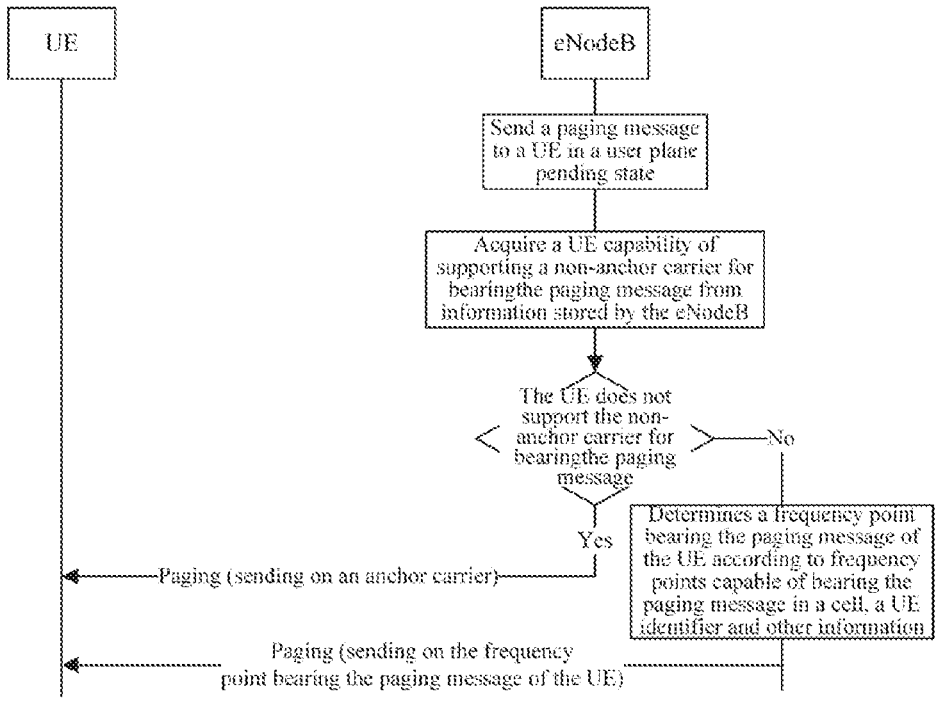
FIG. 13 is a flowchart of a process for acquiring a paging characteristic that a non-anchor carrier bears a paging message when the paging message is sent to a UE in a user plane pending state according to a preferred embodiment of the present disclosure.

FIG. 13 is a flowchart of a process for acquiring a paging characteristic that a non-anchor carrier bears a paging message when the paging message is sent to a UE in a user plane pending state according to a preferred embodiment of the present disclosure. As shown in FIG. 13, the preferred embodiment of the present disclosure provides an example in which the eNodeB acquires the paging characteristic of the UE that the non-anchor carrier bears the paging message from UE context storage information. The process includes the steps described below. When the eNodeB sends the paging message to the UE in the user plane pending state, the eNodeB first acquires the paging characteristic of the UE that the non-anchor carrier bears the paging message from information stored by the eNodeB. The eNodeB then determines whether the UE supports the characteristic that the non-anchor carrier bears the paging message according to the indication for the paging characteristic of the UE that the non-anchor carrier bears the paging message. If the UE does not support the characteristic, the eNodeB sends the paging message on the anchor carrier to the UE; otherwise, the eNodeB determines the carrier for bearing the paging message of the UE according to the carriers capable of bearing the paging message in the cell, the UE identifier and other information and sends the paging message on the carrier to the UE.

Embodiment 3

This embodiment provides a device for determining a carrier for bearing a paging message. The device is configured for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 14:
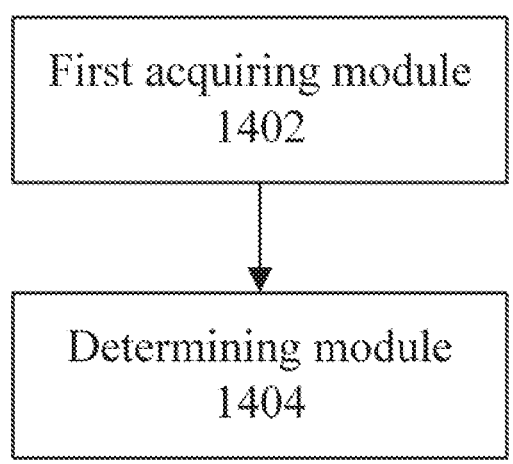
FIG. 14 is a block diagram of a device for determining a carrier for bearing a paging message according to an embodiment of the present disclosure.

FIG. 14 is a block diagram of a device for determining a carrier for bearing a paging message according to an embodiment of the present disclosure. As shown in FIG. 14, the device includes a first acquiring module 1402 and a determining module 1404.

The first acquiring module 1402 is configured to acquire a paging characteristic of a terminal from a paging message sent by a mobility management entity (MME) or information locally stored by a base station, where the paging characteristic indicates whether a terminal has a capability of supporting a non-anchor carrier for bearing the paging message.

The determining module 1404 is connected to the first acquiring module 1402 and configured to determine a carrier for bearing the paging message corresponding to the terminal according to the paging characteristic.

When the above device is used, the first acquiring module 1402 acquires the paging characteristic of the terminal from the paging message sent by the MME or the information locally stored by the base station to enable the paging characteristic of the terminal to be acquired so that the determining module 1404 may determine the carrier for bearing the paging message corresponding to the terminal according to the acquired paging characteristic of the terminal. In this way, paging messages of different terminals in a cell may be shared by determined carriers, thereby solving the problem in the related art of a restricted paging capacity of a multi-carrier cell and improving the paging capacity of the multi-carrier cell.

It is to be noted that the determining module 1404 may be further configured to parse information in the paging message to acquire the paging characteristic of the terminal after the paging message is acquired.

In one embodiment of the present disclosure, the determining module 1404 may be further configured to determine the carrier for bearing the paging message corresponding to the terminal to be an anchor carrier or the non-anchor carrier when the paging characteristic indicates that the terminal has the capability of supporting the non-anchor carrier for bearing the paging message, and determine the carrier for bearing the paging message corresponding to the terminal to be the anchor carrier when the paging characteristic indicates that the terminal has no capability of supporting the non-anchor carrier for bearing the paging message. That is, by applying the determining module 1404, paging messages borne on part of the anchor carriers may be shared by the non-anchor carrier so that paging of all users will not be concentrated on the anchor carrier, avoiding the problem of the restricted capacity of the cell.

It is to be noted that one cell may have multiple non-anchor carriers so that which non-anchor carrier or which non-anchor carriers bear the paging message of the terminal is further to be determined. Therefore, in one embodiment of the present disclosure, the determining module 1404 may be further configured to determine, according to a preset correspondence between a carrier capable of bearing the paging message in a cell where the terminal is located and a terminal identifier, the carrier for bearing the paging message corresponding to the terminal to be the anchor carrier or the non-anchor carrier.

In one embodiment of the present disclosure, the device may further include a sending module. The sending module is connected to the first acquiring module 1402 and configured to send indication information for indicating whether the cell where the terminal is located supports the non-anchor carrier for bearing the paging message to the MME via S1 interface signaling. The sending module sends the indication information to the MME to enable the MME to determine whether to carry the paging characteristic of the terminal in the paging message sent to the base station. For example, in the case where the indication information indicates that the cell where the terminal is located does not support the non-anchor carrier for bearing the paging message, the paging message sent by the MME to the base station does not carry the paging characteristic of the terminal; in the case where the indication information indicates that the cell where the terminal is located supports the non-anchor carrier for bearing the paging message, the paging message sent by the MME to the base station carries the paging characteristic of the terminal. However, it is not limited thereto.

It is to be noted that the S1 interface signaling may be an S1 establishment request message or a configuration update message of the base station, but it is not limited thereto.

In one embodiment of the present disclosure, the device may further include a second acquiring module and a storage module. The second acquiring module is connected to the first acquiring module 1402 and configured to acquire, from radio resource control (RRC) signaling reported by the terminal, the paging characteristic of the terminal. The storage module is connected to the second acquiring module and configured to store the paging characteristic of the terminal in the information.

It is to be noted that the RRC signaling may include at least one of an RRC connection request message, an RRC connection recovery request message, an RRC reestablishment request message, an RRC connection establishment complete message, an RRC connection recovery complete message or an RRC connection reestablishment complete message.

It is to be noted that the paging characteristic of the terminal may be indicated by at least one of: a cell, a bit in a cell, a paging type and a terminal type.

In one embodiment, the paging characteristic of the terminal may be represented by a single cell or by a value of some bit in a cell; and may be represented explicitly or implicitly. For example, some indication domain with a value of 1 indicates that the UE supports the characteristic that the non-anchor carrier bears the paging message and some indication domain with a value of 0 indicates that the UE does not support the characteristic that the non-anchor carrier bears the paging message. Alternatively, the signaling including some indication domain with a value of "TRUE" indicates that the UE supports the characteristic that the non-anchor carrier bears the paging message and the signaling including no indication domain indicates that the UE does not support the characteristic that the non-anchor carrier bears the paging message. Alternatively, different types of UEs implicitly indicate whether the UE supports the non-anchor carrier for bearing the paging message. Alternatively, the paging type indicates whether the UE supports the non-anchor carrier for bearing the paging message (for example, a paging type 1 is regular paging and only supports the anchor carrier for bearing paging information, and a paging type 2 is multi-carrier cell paging and supports the anchor carrier and non-anchor carrier for bearing the paging information).

It is to be noted that the above device may be disposed in the base station. In one embodiment, the base station may be, but is not limited to, a base station that supports the non-anchor carrier for bearing the paging message.

It is to be noted that the above device may be applied to an NB-IoT system, but it is not limited thereto.

The embodiments of the present disclosure further provide a base station including the device for determining the carrier for bearing the paging message in the embodiment 3.

It is to be noted that the various modules described above may be implemented by software or hardware. Implementation by hardware may, but may not necessarily, be performed in the following manners: the various modules described above are located in a same processor or their respective processors.

Embodiment 4

This embodiment provides an device for sending a paging message. The device is used for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 15:
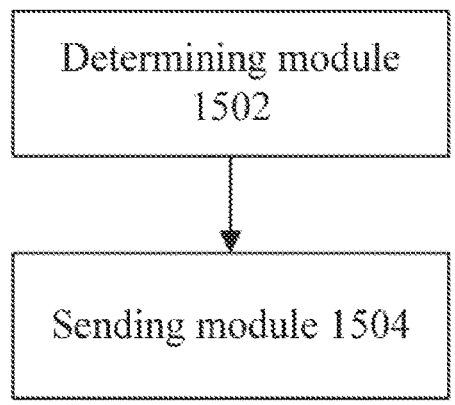
FIG. 15 is a block diagram of a device for sending a paging message according to an embodiment of the present disclosure.

FIG. 15 is a block diagram of a device for sending a paging message according to an embodiment of the present disclosure. As shown in FIG. 15, the device includes a determining module 1502 and a sending module 1504.

The determining module 1502 is configured to determine whether a paging message sent to a base station carries a paging characteristic of a terminal.

The sending module 1504 is connected to the determining module 1502 and configured to send the paging message to the base station. The paging message carries the paging characteristic of the terminal and the paging characteristic indicates whether the terminal has a capability of supporting a non-anchor carrier for bearing the paging message. The paging characteristic is used by the base station for determining a carrier for bearing the paging message corresponding to the terminal.

By using the above device, the paging characteristic of the terminal is carried in the paging message sent by the sending module 1504 to the base station to enable the base station to acquire the paging characteristic of the terminal when the base station acquires the paging message so that the carrier for bearing the paging message corresponding to the terminal may be determined according to the paging characteristic. In this way, paging messages of different terminals in a cell may be shared by determined carriers, thereby solving the problem in the existing art of a restricted paging capacity of a multi-carrier cell and improving the paging capacity of the multi-carrier cell.

It is to be noted that whether the paging message sent by the sending module 1504 to the base station carries the paging characteristic of the terminal needs to be further determined. The paging characteristic of the terminal may not be carried when there is no need. Therefore, in one embodiment of the present disclosure, the determining module 1502 may be further configured to determine, according to indication information and the paging characteristic of the terminal, whether the paging message sent to the base station carries the paging characteristic of the terminal. The indication information is acquired from the base station and configured for indicating whether a cell where the terminal is located supports the non-anchor carrier for bearing the paging message. The determining module 1502 is configured to determine that the paging message carries the paging characteristic of the terminal when the indication information indicates that the cell where the terminal is located supports the non-anchor carrier for bearing the paging message and the paging characteristic of the terminal indicates that the terminal has the capability of supporting the non-anchor carrier for bearing the paging message. The determining module 1502 is configured to determine that the paging message carries the paging characteristic of the terminal or not when the indication information indicates the cell where the terminal is located supports the non-anchor carrier for bearing the paging message and the paging characteristic of the terminal indicates that the terminal has no capability of supporting the non-anchor carrier for bearing the paging message.

It is to be noted that the paging message carrying the paging characteristic of the terminal includes: carrying the paging characteristic of the terminal using a specific indication domain in the paging message sent to the base station. When a value of the specific indication domain is a first value, the terminal has the capability of supporting the non-anchor carrier for bearing the paging message; and when the value of the specific indication domain is a second value, the terminal has no capability of supporting the non-anchor carrier for bearing the paging messages. The paging message carrying no paging characteristic of the terminal includes: having no specific indication domain in the paging message.

It is to be noted that the sending module 1504 may be disposed separately or disposed together with the determining module 1502, but it is not limited thereto.

In one embodiment of the present disclosure, the device may further include an acquiring module. The acquiring module with the sending module 1504 is configured to acquire the paging characteristic of the terminal through a non-access stratum (NAS) message or access stratum (AS) signaling sent by the terminal or acquire the paging characteristic of the terminal from subscription information of the terminal at the time of initial attach or a tracking area update of the terminal.

It is to be noted that the device may further include a storage module. The storage module is connected to the acquiring module and configured to store the acquired paging characteristic of the terminal.

It is to be noted that the NAS message may include, but is not limited to, at least one of: an attach request message and a tracking area update (TAU) request message. The AS signaling may include, but is not limited to, at least one of: terminal capability information of an air interface and a terminal capability information indication of an S1 interface.

It is to be noted that the paging characteristic of the terminal may be indicated by at least one of: a cell, a bit in a cell, a paging type and a terminal type.

In one embodiment, the paging characteristic of the terminal may be represented by a single cell or by a value of some bit in a cell; and may be represented explicitly or implicitly. For example, some indication domain with a value of 1 indicates that the UE supports the characteristic that the non-anchor carrier bears the paging message and some indication domain with a value of 0 indicates that the UE does not support the characteristic that the non-anchor carrier bears the paging message. Alternatively, the signaling including some indication domain with a value of "TRUE" indicates that the UE supports the characteristic that the non-anchor carrier bears the paging message and the signaling including no indication domain indicates that the UE does not support the characteristic that the non-anchor carrier bears the paging message. Alternatively, different types of UEs implicitly indicate whether the UE supports the non-anchor carrier for bearing the paging message. Alternatively, the paging type indicates whether the UE supports the non-anchor carrier for bearing the paging message (for example, a paging type 1 is regular paging and only supports the anchor carrier for bearing paging information, and a paging type 2 is multi-carrier cell paging and supports the anchor carrier and non-anchor carrier for bearing the paging information).

It is to be noted that the above device may be disposed in the mobility management entity (MME). Specifically, the MME may be, but is not limited to, an MME in the network architecture shown in FIG. 1.

It is to be noted that the above device may be applied to an NB-IoT system, but it is not limited thereto.

The embodiments of the present disclosure further provide an MME including the device for sending the paging message in this embodiment.

It is to be noted that the various modules described above may be implemented by software or hardware. Implementation by hardware may, but may not necessarily, be performed in the following manners: the various modules described above are located in a same processor or their respective processors.

Embodiment 5

The preferred embodiments of the present disclosure further provide a system including the base station in the embodiment 3 and the MME and the terminal in the embodiment 4.

It is to be noted that the terminal described above is configured to report a paging characteristic of the terminal to the MME through a non-access stratum (NAS) message or access stratum (AS) signaling at the time of initial attach or a tracking area update, or report the paging characteristic of the terminal to the base station via radio resource control (RRC) signaling in an RRC establishment process. The paging characteristic indicates whether the terminal has a capability of supporting a non-anchor carrier for bearing a paging message.

It is to be noted that the terminal described above is further configured to determine a carrier for receiving the paging message sent by the base station according to the paging characteristic of the terminal, a carrier capable of bearing the paging message in a cell where the terminal is located and a terminal identifier.

To better understand the embodiments 3 to 5 of the present disclosure, the present disclosure will be further described below in conjunction with preferred embodiments.

Figure 16:
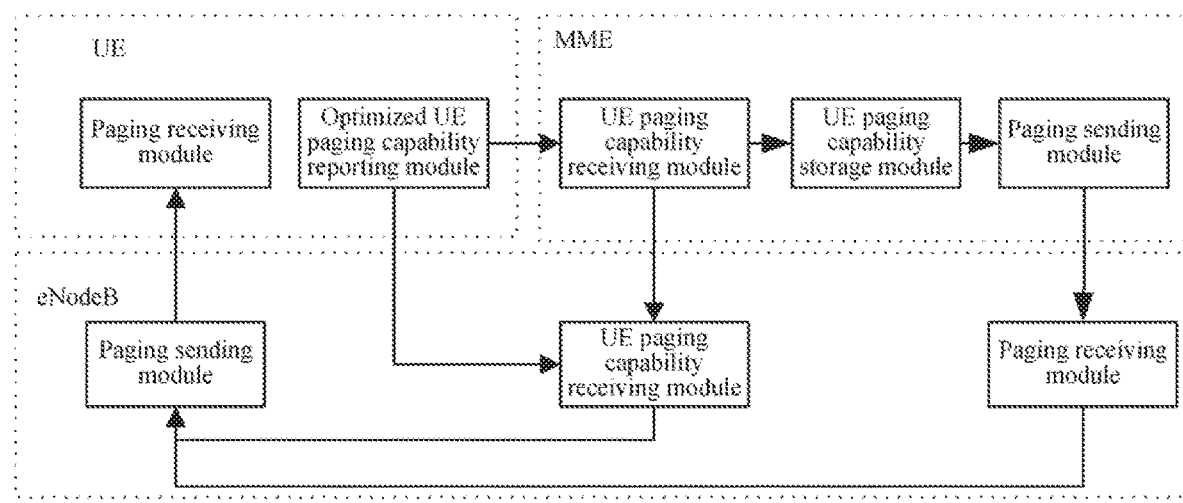
FIG. 16 is a structural diagram of a system according to a preferred embodiment of the present disclosure.

The preferred embodiments of the present disclosure further provide a system in which an eNodeB acquires a paging characteristic of a UE that a non-anchor carrier bears a paging message. FIG. 16 is a structural diagram of a system according to a preferred embodiment of the present disclosure. As shown in FIG. 16, the system in this preferred embodiment includes three network elements: the UE (equivalent to the terminal described above), the eNodeB (equivalent to the base station in the embodiment 3) and an MME (equivalent to the MME in the embodiment 4).

The UE includes two modules.

A reporting module of the capability of the UE to support the non-anchor carrier for bearing the paging message reports the paging characteristic of the UE that the non-anchor carrier bears the paging message to the MME through an NAS message at the time of initial attach or a TAU of the UE, or reports the paging characteristic of the UE that the non-anchor carrier bears the paging message to the eNodeB via RRC signaling during an RRC establishment process of the UE.

A paging receiving module determines, according to the paging characteristic of the UE that the non-anchor carrier bears the paging message, a carrier capable of bearing the paging message in a cell, a UE identifier and the like, and monitors, a carrier for receiving paging and receives paging information on the carrier for receiving the paging on a paging occasion.

The eNodeB includes three modules.

A paging receiving module (equivalent to the first acquiring module 1402 in the embodiment 3) receives the paging message from the MME and parses the paging characteristic of the UE that the non-anchor carrier bears the paging message which may be carried in the paging message.

A UE paging capability receiving module (equivalent to the second acquiring module in the embodiment 3) receives the paging characteristic of the UE that the non-anchor carrier bears the paging message reported by the UE via the RRC signaling.

A UE paging capability storage module (equivalent to the storage module in the embodiment 3) stores the paging characteristic of the UE that the non-anchor carrier bears the paging message reported by the UE via the RRC signaling.

A paging sending module (equivalent to the determining module 1404 in the embodiment 3) in the eNodeB determines, according to the paging characteristic of the UE that the non-anchor carrier bears the paging message carried in the paging message sent by the MME or stored in the UE paging capability storage module in the eNodeB, the carrier capable of bearing the paging information in the cell, the UE identifier and the like, the carrier for receiving the paging of the UE and sends the paging message to the UE on this carrier.

The MME includes three modules.

A UE paging capability receiving module (equivalent to the acquiring module in the embodiment 4) receives the paging characteristic of the UE that the non-anchor carrier bears the paging message reported by the UE at the time of the initial attach or the TAU.

A UE paging capability storage module (equivalent to the storage module in the embodiment 4) stores the paging characteristic of the UE that the non-anchor carrier bears the paging message reported by the UE at the time of the initial attach or the TAU.

Optionally, a paging sending module (equivalent to the sending module 1504 in the embodiment 4) carries, in the paging message, the paging characteristic of the UE that the non-anchor carrier bears the paging message stored in the UE paging capability storage module in the MME when the MME sends the paging message. When the UE is in a pending state, the MME may not carry, in the paging message, the paging characteristic of the UE that the non-anchor carrier bears the paging message.

Embodiment 6

The embodiments of the present disclosure further provide a storage medium. Optionally, in this embodiment, the storage medium may be configured to store program codes for executing the steps in the method in the embodiment 1 or 2.

Optionally, in this embodiment, the storage medium may include, but is not limited to, a U disk, a read-only memory (ROM), a random access memory (RAM), a mobile hard disk, a magnetic disk, an optical disk or another medium capable of storing program codes.

Optionally, in this embodiment, a processor executes the steps in the method in the embodiment 1 or 2 according to the program codes stored in the storage medium.

Optionally, for specific examples in this embodiment, reference may be made to the examples described in the above embodiments and optional implementation modes, and repetition will not be made in this embodiment.

Apparently, those skilled in the art should understand that the modules or steps described above of the present disclosure may be implemented by a general-purpose computing device, the modules or steps may be integrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A method for determining a carrier for bearing a paging message, applied to a base station, comprising:
   receiving a first paging message sent by a mobility management entity (MME), wherein the first paging message carries paging characteristic information of a terminal, wherein the paging characteristic information is used for indicating whether the terminal supports to receive the paging message on a non-anchor carrier; and
   in condition that the terminal supports to receive the paging message on the non-anchor carrier, determining a carrier for bearing a second paging message according to an identifier of the terminal;
   sending the second paging message to the terminal.

2. The method of claim 1, wherein the determined carrier for bearing the second paging message according to the identifier of the terminal is an anchor carrier.

3. The method of claim 1, wherein the method further comprises:
   receiving User Equipment (UE) capability information sent by the base station, wherein the UE capability information comprises the characteristic information of the terminal;
   sending an UE capability information indication message to the MME, wherein the UE capability information indication message comprises the characteristic information of the terminal.

4. A method for sending a paging message, applied to a mobility management entity (MME), comprising:
   sending a first paging message to a base station;
   wherein the first paging message carries paging characteristic information of a terminal, and the paging characteristic information is used for indicating whether the terminal supports to receive the paging message on a non-anchor carrier.

5. The method of claim 4, wherein the first paging message carrying the paging characteristic information of the terminal comprises: carrying the paging characteristic information of the terminal through a specific indication domain in the first paging message;
wherein in response to determining that a value of the specific indication domain is TRUE, the terminal supports to receive the paging message on the non-anchor carrier.

6. The method of claim 4, further comprising:
receiving a User Equipment (UE) capability information indication message sent by the base station, acquiring the paging characteristic information of the terminal according to the UE capability information indication message.

7. A base station, comprising:
a processor; and
a memory for storing instructions executable by the processor, wherein the processor is configured to execute the method for determining a carrier for bearing a paging message of claim 1.

8. A mobility management entity (MME), comprising:
a processor; and
a memory for storing instructions executable by the processor, wherein the processor is configured to execute the method for sending a paging message of claim 4.

9. A system, comprising: a base station, a MME and a terminal;
wherein the terminal is configured to report a paging characteristic of the terminal to the MME via a non-access stratum (NAS) message or access stratum (AS) signaling at a time of initial attach or a tracking area update, or report the paging characteristic of the terminal to the base station via radio resource control (RRC) signaling in an RRC establishment process, wherein the paging characteristic indicates whether the terminal includes a capability of supporting a non-anchor carrier for bearing a paging message;
wherein the base station is configured to: send indication information for indicating whether a cell where the terminal is located supports the non-anchor carrier for bearing the paging message to the MME via S1 interface signaling.

10. The system of claim 9, wherein the terminal is further configured to determine a carrier for receiving a paging message sent by the base station according to the paging characteristic of the terminal, and a carrier capable of bearing the paging message in a cell where the terminal is located and a terminal identifier.

11. A non-transitory storage medium, comprising stored programs, wherein, when executed, the programs execute the method of claim 1.

12. A non-transitory storage medium, comprising stored programs, wherein, when executed, the programs execute the method of claim 4.

13. The base station of claim 7, wherein the determined carrier for bearing the second paging message according to the identifier of the terminal is an anchor carrier.

14. The MME of claim 8, wherein the determined carrier for bearing the second paging message according to an identifier of the terminal is an anchor carrier or the non-anchor carrier.

15. The MME of claim 8, further comprising:
receiving a User Equipment (UE) capability information indication message sent by the base station, acquiring the paging characteristic of the terminal according to the UE capability information indication message.

16. The method of claim 1, wherein the determined carrier for bearing the second paging message according to the identifier of the terminal is a non-anchor carrier.

17. The base station of claim 7, wherein the determined carrier for bearing the second paging message according to the identifier of the terminal is a non-anchor carrier.

* * * * *